United States Patent [19]

Diebolder

[11] 4,114,826

[45] Sep. 19, 1978

[54] CABLE DRUM WITH ROTATABLE POSITIONING

[76] Inventor: Helmut Diebolder, Hauptstrasse 5, 7919 Osterberg, Fed. Rep. of Germany

[21] Appl. No.: 774,417

[22] Filed: Mar. 4, 1977

[30] Foreign Application Priority Data

Mar. 8, 1976 [DE] Fed. Rep. of Germany ....... 2609572

[51] Int. Cl.² ............................................. B65H 17/46
[52] U.S. Cl. ...................................... 242/85; 191/12.4
[58] Field of Search ....................... 242/85, 115, 99, 77, 242/96, 116, 86, 117, 129, 76; 191/12.2, 12.4

[56] References Cited

U.S. PATENT DOCUMENTS

| | | |
|---|---|---|
| 2,049,086 | 7/1936 | Shingleton ........................ 191/12.4 |
| 3,536,275 | 10/1970 | Salomon ........................... 242/86 X |
| 3,840,713 | 10/1974 | Carpentier ......................... 242/129 |

Primary Examiner—Edward J. McCarthy
Attorney, Agent or Firm—Bruce K. Thomas

[57] ABSTRACT

A cable drum with a reel member rotatably supported in a bearing bolt from an exterior bearing flange with a central recess encompassing an outer circumferentially-grooved bearing member on the bearing bolt.

6 Claims, 1 Drawing Figure

U.S. Patent  Sept. 19, 1978  4,114,826
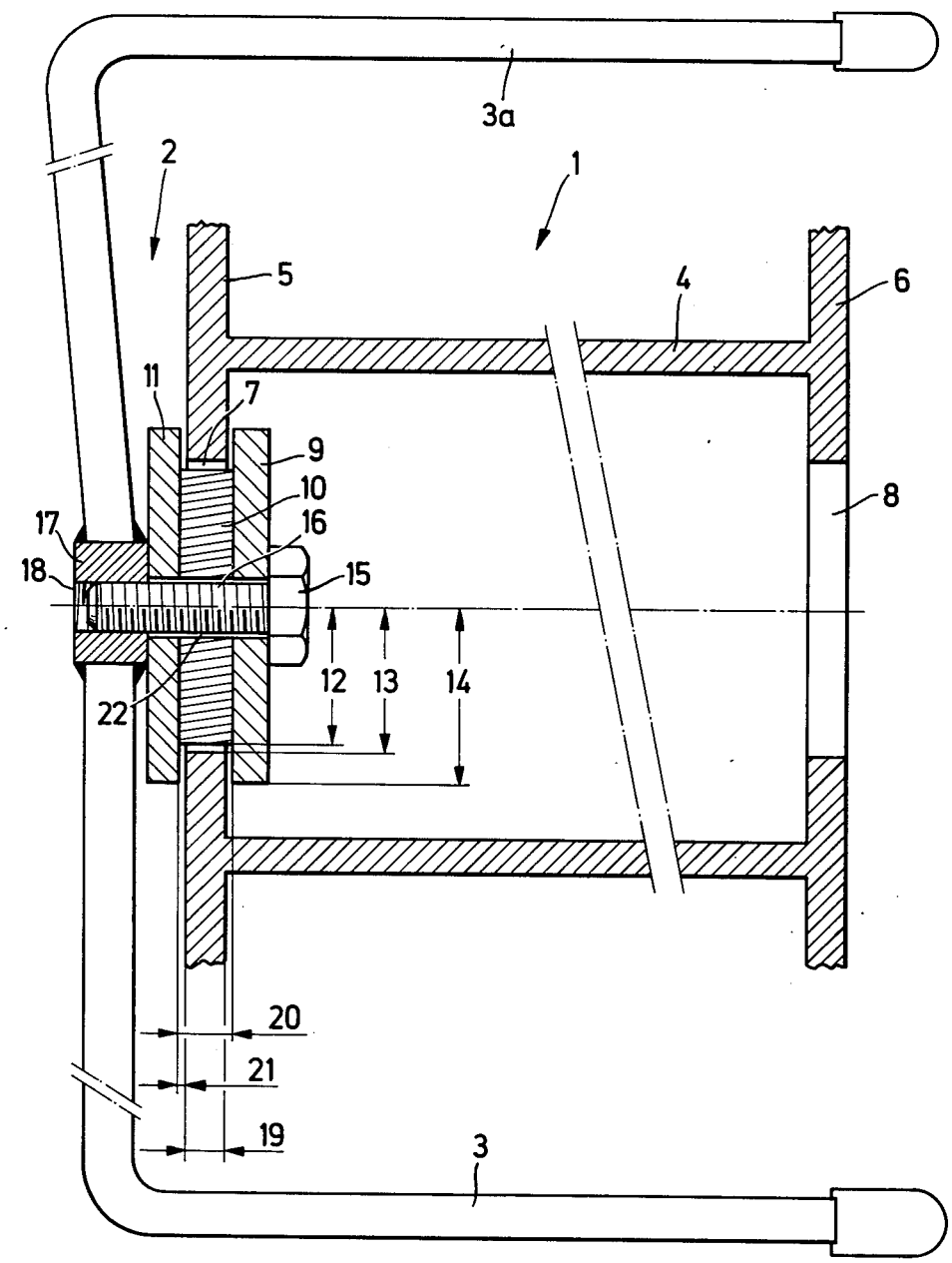

CABLE DRUM WITH ROTATABLE POSITIONING

The invention relates to a cable drum with rotatable positioning at a frame, formed by a body symmetrical as to rotation, which is closed at its frontal sides bilaterally by cover flanges and rotatably positioned on a bearing bolt connected unilaterally to the frame.

Cable drums of the initially described type are used to assure a power connection for consuming devices located at a great distance from electrical connections. The cable drum should be portable, the cable should be windable without difficulties on the cable drum. For that purpose it is advantageous for the positioning of the cable drum on the frame to be low in friction, so that the winding of the cable upon the rotatable cable drum can be accomplished without requiring too much power. Mostly the frame is formed by a so-called tripod, that is to say, starting out from the fastening of the bearing bolt for the positioning of the drum, legs are placed at a distance from each other for the purpose of providing the cable drum with the necessary stability. Furthermore, viewed from the point of fastening, in most cases a handle is provided which assures the easy portability of the cable drum.

In the cable drums known according to prior art the cable drum was positioned at the frame in such a manner that a bearing bolt was connected to the frame unilaterally, with the cable drum being positioned on said bolt in a rotatable manner. The positioning was accomplished by arranging recesses in the bilateral cover flanges with the bearing bolt extending through said recesses. The bearing bolt was positioned via ball or roller bearings at the two cover flanges placed at a distance from each other.

This type of positioning is costly, because two bearings are applied, namely one in the cover flange which is adjacent to the fastening point of the bearing bolt at the frame and a second bearing in the cover flange which is distal to the fastening point at the frame. Thus, according to prior art, the cable drum always was positioned rotatably on the bearing bolt in a twofold manner. Such a positioning also was required according to prior art because high surface-pressure forces were generated between the bearing bolt with a relatively small diameter and the associated surfaces of the recesses in the cover flange.

Then this positioning was so low in friction that an additional brake adjusting nut had to be mounted at the bearing bolt; it adhered to one of the cover flanges and by increased friction it prevented the cable drum from rotating too rapidly during the unwinding of the cable from the cable drum, as this would cause twistings. In addition, it was a matter of general knowledge that an unreeling safety had to be applied in the form of a threaded screw connected to the frame and which by adjustment at the outer circumference could be contacted with a cover flange in order to thereby block the rotation of the cable drum completely.

The present invention is based on the problem of so designing a cable drum with rotatable positioning of the initially described kind that the positioning can be designed considerably more simply and at a much lower cost. The present invention also is based on the additional problem of so designing the positioning that it can easily be mounted and absorb high forces of pressure, and that in addition it will be maintenance-free.

The problem is solved by a cable drum as described initially; it is characterized by the fact that the cover flange facing the frame is positioned rotatably on the bearing bolt with the aid of a disk bearing.

Several important advantages are achieved by the present invention over the state of the art. The invention utilizes the realization that only the bearing located at the frame does the supporting. The bearing which in the frame according to prior art is placed in the cover flange which was distal to the frame was used primarily to transmit the high flexural torques transmitted from the cable drum to the bearing bolt, to the bolt at low twisting and low friction. According to the present invention the bearing now is eliminated which previously was located in the cover flange which was distal to the fastening point of the bearing bolt at the frame. According to the present invention, the high flexural torques to be transmitted from the cable drum to the bearing bolt are absorbed by a disk bearing and transmitted at low friction to the bearing bolt. This arrangement accomplishes that the production costs are considerably lower, because as far as cost is concerned, a disk bearing can be produced under more favorable conditions than two ball or roller bearings arranged separately from each other in the cover flanges.

According to one advantageous embodiment of the present invention the disk bearing comprises three disks which are arranged jointly and rotatably on the bearing bolt, of which the central disk bears the cover flange of the cable drum facing the fastening point of the bearing bolt at the frame. Thereby the cover flange has a central recess with a relatively large diameter, into which one bearing disk is inserted with a small diameter, its thickness being greater than the depth of the recess. This assures the bearing disk to slightly protrude with its anterior and posterior side beyond the external and interior side of the cover flange. On disk each, whose diameter is greater than the diameter of the recess is placed in each case on the anterior and posterior side of the bearing disk. This means that the disks show with their outer circumference a smaller distance to the surfaces of the cover flange, namely the distance by which the bearing disk is thicker than the depth of the recess in the cover flange.

The three disks have a joint continuous perforation through which the bearing bolt extends and tensions the disks together with the cover flange against the fastening at the frame.

Thus, the cover flange of the cable drum is supported by the central bearing disk with the disks arranged on the inner and outer side at a slight distance from the cover flange prevent a tipping of the bearing disk and of the cover flange. The disks arranged on both sides of the bearing disk substantially absorb the flexural torques acting on the cable drum and transmitted to the rotary bearing.

By selecting the recess in the cover flange in a relatively large size, so that a bearing disk with a relatively large diameter can be mounted, assurance is given that the forces acting at the outer circumference and transmitted to the bearing disk remain low, because the effective surface of the bearing disk is large.

By selecting a thickness of the bearing disk greater than the depth of the recess in the cover flange (thickness of the cover flanges), assurance is given that the disks adhering to the bearing disk on both sides show a slight distance with reference to the associated surfaces of the cover flange. As a result vertical forces are transmitted directly via the centrally located bearing disk to the bearing bolt and thus to the frame. If now flexural torques act on the cable drum, said cable drum is twisted by a few millimeters, so that the outer surfaces of the bearing flange adhere at the associated surfaces of the disks, on both sides of the bearing disk. Again, the frictional forces acting there are low, because the disks have a large diameter and the bending forces are already absorbed with a large lever arm distal from the bearing bolt and transmitted via disks to the bearing bolt. The surface pressure between the cover flange and the associated surfaces of the disks thus is extraordinarily low, thanks to the large diameter of the disks.

According to the present invention, thus the two-point positioning of a cable drum on a bearing bolt is changed into a one-point positioning. The acting vertical forces and flexural torques are transmitted via largely dimensioned disks to the bearing bolt.

Additional important characteristics and advantages become clear from the illustration and the corresponding description.

The illustration shows a section through a cable drum with frame and a disk positioning according to the present invention.

In the drawing the cable drum is formed from a rotatable cable drum 1 positioned rotatably at the frame 2 via a screw 15. The frame thereby is formed from a handle 3a and legs 3 arranged at a distance from each other which are welded together at the fastening means of the disk bearing. Thereby the cable drum 1 consists of a body symmetrical as to rotation shown in this embodiment as a pipe 4. However, this pipe 4 also may be replaceable by individual bars forming the shape of a pipe. On the frontal side the pipe 4 is sealed on both sides by cover flanges 5 and 6. A recess 8 is placed in the anterior cover flange 6 for fastening therein a three-pin plug. The cover flange 5 contains the disk bearing according to the invention. The disk bearing is formed by providing in the cover flange 5 a central recess 7 having a relatively large diameter 13. A bearing disk 10 having a small diameter 12 is mounted into the recess 7. The thickness 20 of the bearing disk 10 is greater than the depth 19 of the recess 7 (that is the thickness of the cover flange 5). If for example the thickness of the cover flange is 5.1 mm the thickness of the disk could be 1.75 mm. As a result, the bearing disk 10 protrudes by 0.12 mm over the surfaces of the cover flange 5. This play is identified in the drawing by position 21.

One disk 9, 11 each is arranged in each case on the anterior and posterior side of the bearing disk 10. The diameter 14 of each disk 9, 11 is larger than the diameter 13 of the recess 7. This assures that the disks 9, 11, distal by the play 21, have a distance from the associated surfaces of the cover flange 5, so that they will have no direct physical contact with the cover flange 5. Only when the cable drum 1 is twisted (flexural torque) will the surfaces of the cover flange 5 come in contact with the associated surfaces of the disks 9 and 11. However, since the disks 9 and 11 have a large diameter and the flexural forces already are absorbed at a great distance from the flexural axis (bearing bolt 16), only relatively small flexural forces act on the disks 9, 11, which moreover also are absorbed by relatively large surfaces. Thus, the surface pressure between the surfaces of the cover flange 5 and the associated surfaces of the disks 9 and 11 is low.

In lieu of the disks 9 and 11 several disks arranged back to back also may be used which assure additional reduction of the rotary friction.

The disks 9, 10, 11 have a central perforation 22 through which the bolt 16 of a screw 15 extends. The thread of the bolt 16 is received by the thread 18 of the nut 17 which forms the fastening of the disk bearing on the frame side. By tightening the screw 15 the disks 9, 10, 11 are tensioned against the nut 17. Thus the disk bearing can be mounted with the aid of this only screw.

Because of the low assembly cost the use of a screw 15 with the threaded bolt 16 is advantageous. However, it also is possible to fixedly connect a threaded bolt with the nut 17, for example by welding, so that the head of the screw would then be eliminated. The disks 9, 10, 11 could be pushed over the bolt 16 that way and instead of the head a nut could be screwed on from the inside of the cable drum which, if necessary also could be locked with the aid of a second nut.

The recess 8 applied to the anterior cover flange 6 is used to mount the screw 15 and to mount the disk bearing. After the completion of the mounting a three-pin plug is inserted for example into the recess 8 and fastened to the anterior cover flange.

The solution according to the invention had made it possible in a simple and low-cost manner to transmit high flexural torques and bearing forces via a unilateral positioning to a fastening on the frame side, without having to tolerate thereby a substantially higher friction in the bearing. A certain bearing friction even is desirable so that no brake adjusting nut is needed which was required in the ball bearing positioning to avoid any unintentional too rapid unreeling of the cable drum during the unwinding of a cable. If necessary, the disk bearing also may be lubricated, and the disks 9, 11 may be designed as brass pulleys or disks. It also is possible to apply at the friction surfaces friction-reducing intermediate disks. However, this modification is intended only for particular embodiments. The advantages of the present invention are precisely the result of the simplicity and the low manufacturing costs of the disk bearing according to the invention.

I claim:
1. A cable drum comprising:
 a frame member unilaterally supporting a bearing bolt having a distal head member;
 a reel member having a central hub with an interior bearing flange defining a central recess encompassing and spaced from said bearing bolt; and
 a bearing member within said recess encompassing said bearing bolt and retained by said head member;
 said bearing member defining an outer circumferential groove that extends in annular spaced bearing relationship with said internal bearing flange as the rotational support for said reel member.
2. A cable drum in accordance with claim 1 in which:
 said bearing member comprises a pair of bearing disks having diameters larger than said recess and an intermediate bearing member within and spaced from said recess to define said groove; and
 said frame member includes a threaded member engaged by said bearing bolt whereby to impinge said distal head member against said bearing members.
3. A cable drum rotatably mounted from a frame (2) including:
 a cylindrical reel (1) closed bilaterally at its frontal sides by cover flanges (5, 6) and rotatably posi- tioned on a bearing bolt (16) in its interior and connected unilaterally to said frame (2);

one of said cover flanges (5) facing the frame (2) having a central recess (7) containing a bearing disk (10);

the lateral thickness (20) of said bearing disk (10) being greater than the lateral depth (19) of said recess (7);

the anterior and posterior sides of said bearing disk (10) being provided with a pair of bearing disks (9, 11) having diameters (14) larger than the diameter (13) of said recess (7); and said bearing bolt (15) carrying said bearing disks (9, 10 and 11), and having a screwhead (15) impinging against said bearing disk (9) seated in said drum interior.

4. A cable drum in accordance with claim 3 in which the lateral thickness (20) of said bearing disk (10) is greater than the lateral depth (19) of said recess (7) by about 0.25 mm.

5. A cable drum in accordance with claim 3 in which the diameters (14) of said pair of bearing disks (9, 11) are at least about 1 mm larger than the diameter (13) of said recess (7).

6. A cable drum with a frame having a drum rotatably positioned therefrom comprising in combination a cable drum (4) having on one side a flange (5) wherein coaxially to the axis of rotation of the drum a recess (7) is formed, a disk (10) in said recess, the diameter of said recess being slightly smaller than the interior diameter of the recess (7); the thickness of the disk being greater than the thickness of the flange (5); covering disks (9 and 11), being provided on both sides of the disk (10), which are greater in diameter than the recess (7); the disk (10) and the covering disks (9 and 11) being provided with aligned perforations (22) through which a bolt (16) extends, one end of said bolt being screwed into an inside thread (18) on the frame (17, 3, 3a); said bolt having a bolt head (15) engaging the outside of one of the covering disks, or the bolt is from the other side screwed into an inside thread of said covering disk (9), in which case the bolt is inserted or screwed into the borehole (18) of the frame.

* * * * *

UNITED STATES PATENT OFFICE
CERTIFICATE OF CORRECTION

Patent No. 4,114,826   Dated September 19, 1978

Inventor(s) Helmut Diebolder

It is certified that error appears in the above-identified patent and that said Letters Patent are hereby corrected as shown below:

Column 2, line 37, after "flange" "On" should read -- One --.

Signed and Sealed this

Sixteenth Day of January 1979

[SEAL]

Attest:

RUTH C. MASON
Attesting Officer

DONALD W. BANNER
Commissioner of Patents and Trademarks